(12) United States Patent
Schmidtke et al.

(10) Patent No.: US 9,369,785 B1
(45) Date of Patent: *Jun. 14, 2016

(54) INTEGRATED CONTROLLER FOR ROUTING / SWITCHING NETWORK AND UNDERLYING OPTICAL TRANSPORT SYSTEM

(71) Applicant: Juniper Networks, Inc., Sunnyvale, CA (US)

(72) Inventors: Hans-Juergen W. Schmidtke, Mountain View, CA (US); Gert Grammel, Ditzingen (DE)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/575,662

(22) Filed: Dec. 18, 2014

(51) Int. Cl.
*H04B 10/07* (2013.01)
*H04B 10/03* (2013.01)
*H04B 10/038* (2013.01)
*H04Q 11/00* (2006.01)

(52) U.S. Cl.
CPC ....... *H04Q 11/0005* (2013.01); *H04Q 11/0062* (2013.01)

(58) Field of Classification Search
CPC ...... H04B 10/03; H04B 10/038; H04B 10/07; H04J 2203/0055; H04J 2203/006; H04J 2203/0053; H04Q 2011/0081; H04Q 2011/0083; H04Q 2011/0086
USPC ................................. 398/2, 25, 58
See application file for complete search history.

(56) References Cited

U.S. PATENT DOCUMENTS

| | | | |
|---|---|---|---|
| 6,631,134 B1 | 10/2003 | Zadikian et al. | |
| 7,453,824 B1* | 11/2008 | Nucci | H04J 14/0227 370/254 |
| 7,630,635 B1 | 12/2009 | Guy et al. | |
| 7,724,676 B2 | 5/2010 | Gerstel et al. | |
| 2004/0018016 A1 | 1/2004 | O'Mahony et al. | |
| 2010/0202773 A1* | 8/2010 | Lee | H04J 14/0256 398/48 |
| 2012/0163797 A1* | 6/2012 | Wang | H04L 45/22 398/2 |
| 2012/0201541 A1 | 8/2012 | Patel et al. | |
| 2013/0084075 A1 | 4/2013 | Hussain et al. | |
| 2013/0266316 A1* | 10/2013 | Xia | H04J 14/0257 398/48 |
| 2014/0086570 A1* | 3/2014 | Rider | H04J 14/0257 398/2 |
| 2014/0328587 A1 | 11/2014 | Magri et al. | |
| 2015/0063802 A1 | 3/2015 | Bahadur et al. | |
| 2015/0244453 A1* | 8/2015 | Bottari | H04J 14/00 398/5 |

OTHER PUBLICATIONS

Notice of Allowance from U.S. Appl. No. 14/575,637, mailed Mar. 18, 2015, 14 pp.

(Continued)

*Primary Examiner* — Dalzid Singh
(74) *Attorney, Agent, or Firm* — Shumaker & Sieffert, P.A.

(57) ABSTRACT

Techniques for providing closed-loop control and predictive analytics in packet-optical networks are described. For example, an integrated centralized controller is described that provides tightly-integrated, closed-loop control over components of a routing/switching network (e.g., IP/MPLS) and also the underling optical transport system, including routing wavelength and spectrum assignment. The controller adaptively and proactively maps packet flows into network resources of a routing/switching network and control, based on the mapping, allocation and utilization of optical spectrum and wavelengths within the optical transport system underlying the routing and switching network.

22 Claims, 6 Drawing Sheets

(56) References Cited

OTHER PUBLICATIONS

Vasseur et al., "Path Computation Element (PCE) Communication Protocol (PCEP)," RFC 5440, Network Working Group, IETF Trust, Mar. 2009, 87 pp.

ITU-T G.694.1, Series G: Transmission Systems and Media, Digital Systems and Networks—Transmission media and optical systems characteristics—Characteristics of optical systems, International Telecommunication Union, Feb. 2012, 16 pp.

"OpenFlow Switch Specification Version 1.1.0 Implemented ( Wire Protocol 0x02 )," OpenFlow Consortium, Feb. 28, 2011, 56 pp.

U.S. Appl. No. 14/575,637, by Hans-Juergen W. Schmidtke et al., filed Dec. 18, 2014.

U.S. Appl. No. 14/576,112, by Hans-Juergen W. Schmidtke et al., filed Dec. 18, 2014.

Office Action from U.S. Appl. No. 14/576,112, dated Dec. 24, 2015, 26 pp.

Response filed Jan. 7, 2016 to the Office Action from U.S. Appl. No. 14/576,112, dated Dec. 24, 2015, 10 pp.

* cited by examiner

INTEGRATED CONTROLLER FOR ROUTING / SWITCHING NETWORK AND UNDERLYING OPTICAL TRANSPORT SYSTEM

TECHNICAL FIELD

The disclosure relates to computer networks and, more particularly, to optical networks.

BACKGROUND

Modern communication networks continue to grow at a rapid pace in both geographical size (e.g., sites, racks, physical ports, interconnects) and traffic volume (i.e., bandwidth requirements). Moreover, communication networks are increasingly required to support diverse types of traffic and higher-agility traffic patterns.

To support these requirements, communication networks, such as carrier networks, access networks, core networks, and the like, utilize underlying optical transport systems for transporting, multiplexing and switching communications through high-speed optical fiber links. Many optical transport systems are migrating toward utilizing entirely packet-based communications. That is, optical transport systems for large-scale networks are transitioning to packet-optimized optical transport networks, referred to as Packet Optical Transport.

Packet-Optical Transport represents a convergence of converging time-division multiplexing (TDM) and wave-division multiplexing (WDM) technologies. As such, large-scale packet-optical transport systems utilize a variety of components including Re-configurable Optical Add Drop Multiplexers (ROADMs), Photonic Cross Connects (PXCs), optical cross-connects (OXCs), Dense Wavelength Division Multiplexing equipment (DWDMs), amplifiers, transponders, Optical Termination Terminals (OTTs) and other equipment.

SUMMARY

This disclosure describes techniques for providing closed-loop control and predictive analytics in packet-optical networks. For example, a network element, such as a centralized controller, provides tightly-integrated, closed-loop control over switching and routing services (e.g., IP/MPLS) and the underling optical transport system of a communication network.

In one example implementation described herein, the controller includes an analytics engine that applies predictable analytics to real-time status information received from a monitoring subsystem distributed throughout the underlying optical transport system. Responsive to the status information, the analytics engine applies a rule-based of policies and may adaptively and proactively reroute communications within the network. For example, the controller may provide integrated control of routing and switching components to reroute packet flows within the network with control components of the underlying optical transport network with respect to transport of packet data through the optical links and other equipment. The controller may, for example, provide integrated control over allocation or utilization of optical spectrum and wavelengths within the optical transport system underlying the routing and switching services.

In one example, a method for wavelength and spectrum assignment comprise determining, for each a plurality of packet-optical transport devices interconnected to form an optical transport system, a respective channel group size specifying a number of optical channels to reserve for each of the packet-optical transport devices from a total number of optical channels for the optical transport system, wherein the respective channel group size for each of the packet-optical transport devices is determined based on a bandwidth requirement for the respective packet-optical transport device. The method further comprises reserving, in accordance with the each of the determined channel group sizes, a set of optical channels for each of the packet-optical transport devices from an optical spectrum supported by the packet-optical transport devices, each of the reserved optical channels having an unassigned wavelength, and each of the sets of optical channels being associated with a different portion of the optical spectrum and having an spectral range that is based on the channel group size determined for the respective packet-optical transport device. The method further comprises, for each of the packet-optical transport devices, assigning a respective wavelength from the optical spectrum to one or more of the optical channels of the set of optical channels reserved for the packet-optical transport device to balance network traffic associated with the packet-optical transport device around a center of the portion of the optical spectrum associated with the set of optical channels reserved for the packet-optical transport device. In additional examples, a network controller includes at least one processor configured to perform the above described method.

In another example, an integrated controller for controlling both the routing and switching network and the underlying optical transport system is described. A system may comprising a routing and switching network having a plurality of interconnected layer three (L3) routing components and layer two (L2) switching components for communicating packet-based network traffic, and a plurality of packet-optical transport devices interconnected to form an optical transport system and coupled to the routing and switching system for optically transporting the network traffic between the routing and switching components. A controller may comprise a path computation element to compute paths for the network traffic through the routing and switching network, a software defined networking control module to communicate updated routing information to the routing components of the routing and switching network to control packet flows through the routing and switching network in accordance with the computed paths, and a routing wavelength and spectrum assignment control module to that configures the packet-optical transport devices to operate at particular wavelengths in response to the updated routing information and bandwidth requirements for the network traffic.

In another example, a method comprises receiving, with an integrated network controller, state information from a routing and switching network having a plurality of interconnected layer three (L3) routing components and layer two (L2) switching components for communicating packet-based network traffic. The example method includes computing, with a path computation element of the controller, a plurality of paths for layer three (L3) packets through the routing components, and communicating, with a software defined network (SDN) control module of the controller, updated routing information to the routing components to control packet flows through the routing and switching network in accordance with the computed paths. The example method further includes configuring, with a routing wavelength and spectrum assignment control module of the controller, the packet-optical transport devices to operate at particular wavelengths in response to the computed paths and bandwidth requirements for the network traffic at the routers along the paths.

In another example, an integrated network controller comprises a path computation element that computes paths for the network traffic through a routing and switching network having a plurality of interconnected layer three (L3) routing components and layer two (L2) switching components for communicating packet-based network traffic; a software defined networking (SDN) control module that communicates updated routing information to the routing components of the routing and switching network to control packet flows through the routing and switching network in accordance with the computed paths; and a routing wavelength and spectrum assignment control module that configures each of a plurality of packet-optical transport devices an optical transport system to operate at particular wavelengths in response to the updated routing information and bandwidth requirements for the network traffic for optically transporting the network traffic between the routing and switching components.

In additional examples, integrated network controller is described having predictable analytics and failure avoidance in packet-optical networks. An integrated network controller may comprise: a message processor that receives state information from optical components of an optical transport system having a plurality of interconnected packet-optical transport devices; an analytics engine that applies a set of rules to identify a failure of any of the optical components; a path computation element that, responsive to the identified failure, computes at least one updated path for the network traffic through a routing and switching network having a plurality of interconnected layer three (L3) routing components and layer two (L2) switching components for communicating packet-based network traffic; a software defined networking (SDN) control module that communicates updated routing information to the routing components of the routing and switching network to control packet flows through the muting and switching network in accordance with the updated path; and a routing wavelength and spectrum assignment control module that, in response to the updated routing information, configures each of a plurality of packet-optical transport devices to operate at particular wavelengths based on bandwidth requirements for the network traffic for optically transporting the network traffic between the routing and switching components.

An example method comprises: receiving, with an integrated network controller, state information from optical components of an optical transport system having a plurality of interconnected packet-optical transport devices; applying, with an analytics engine, a set of rules to identify a failure of any of the optical components; computing, with a path computation element of the controller and in response to identifying the failure, at least one updated path through a routing and switching network having a plurality of interconnected layer three (L3) routing components and layer two (L2) switching components for communicating packet-based network traffic; communicating, with a software defined network (SDN) control module of the controller, updated routing information to the routing components to control packet flows through the routing and switching network in accordance with the updated path; and responsive to the updated routing information, configuring, with a routing wavelength and spectrum assignment control module of the controller, the packet-optical transport devices to operate at particular wavelengths based upon bandwidth requirements for the network traffic at each of the routing components.

The details of one or more examples are set forth in the accompanying drawings and the description below.

DETAILED DESCRIPTION

Figure 1:
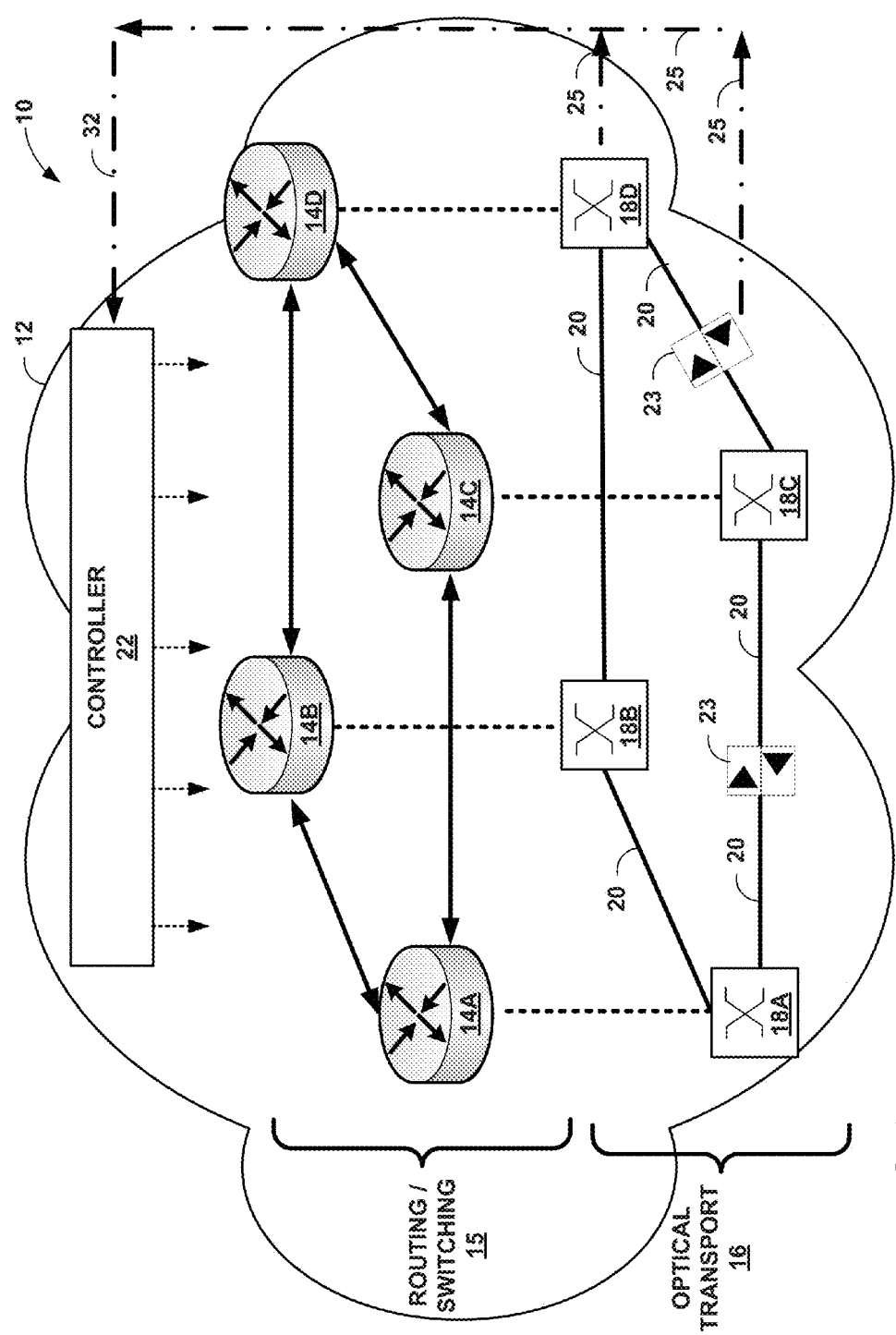
FIG. 1 is a block diagram illustrating an example network in which one or more network devices employ the techniques of this disclosure.

FIG. 1 is a block diagram illustrating an example system 10 in which a network 12 includes one or more network devices that employ the techniques of this disclosure. In this example, network 12 includes a routing/switching system 15 in which network elements 14A-14D ("network elements 14") control switching and routing of packet flows. Examples of network elements 14 include layer three (L3) routers and layer two (L2) switches that collective provide routing/switching system 14.

Network elements 14 of routing/switching system 15 typically provide L2/L3 traffic forwarding services, such as traffic engineering via Multi-Protocol Label Switching traffic-engineered (MPLS-TE) label switched paths (LSP), Virtual Local Area Network (VLANs) and the like. Network elements 14 may communicate and control traffic flows using a variety of traffic engineering protocols, such as the Label Distribution Protocol (LDP) and the Resource Reservation Protocol with Traffic Engineering extensions (RSVP-TE). In some aspects, network elements 14 may be IP routers that implement MPLS techniques and operate as label switching routers (LSRs).

As further shown in FIG. 1, network 12 includes an underlying optical transport system 16 for transporting, multiplexing and switching packet-based communications through high-speed optical fiber links. In the example of FIG. 1A, packet-optical communication devices 18A-18D (collectively, "packet-optical transport devices 18") are interconnected via optical links 20 and control transmission of optical signals carrying packet data along the links. In this way, optical transport system provides a physical layer that physically interconnects network elements 14 of routing/switching layer 15.

Packet-optical transport devices 18 may be, for example, Re-configurable Optical Add-Drop Multiplexers (ROADMs), Photonic Cross Connects (PCXs), Dense Wavelength Division Multiplexing (DWDMs) or other devices that transmit, switch and/or multiplex optical signals. Moreover, as shown in FIG. 1, optical transport system 16 typically includes a number of other components 23, such as amplifiers, transponders, Optical Transport Terminals (OTTs), repeaters and other equipment for controlling transmission of optical packet data along optical links 20. For simplicity, FIG. 1 illustrates only a few optical components 23, although large optical transport systems may have significant numbers of such devices that influence optical transmissions. Although described with respect to only optical links 20, optical transport system 16 may include other types of physical links as well, such as Ethernet PHY, Synchronous Optical Networking (SONET)/Synchronous Digital Hierarchy (SDH), Optical Transport Networks (OTN) switches, Lambda, or other Layer 2 data links that include packet transport capability.

In some example, network 12 may be a service provider network or metro carrier network that provides packet-based network services for subscriber devices (not shown). Example subscriber devices may be, for example, any of personal computers, laptop computers or other types of computing device associated with subscribers. Subscriber devices may comprise, for example, mobile telephones, laptop or desktop computers having, e.g., a 3G, 4G or 5G wireless card, wireless-capable netbooks, video game devices, pagers, smart phones, personal data assistants (PDAs) or the like. Subscriber devices may run a variety of software applications, such as word processing and other office support software, web browsing software, software to support voice calls, video games, videoconferencing, and email, among others.

In the example of FIG. 1, network 12 further includes a controller 22 that provides tightly-integrated, closed-loop control over both routing/switching system 15 and underling optical transport system 16. As further described below, controller 22 receives real-time status information 25 from monitoring agents distributed and installed within packet-optical transport devices 18 and optical components 23 of underlying optical transport system 16. Responsive to the status information, an analytics engine within controller 22 applies a rule-based of policies and may adaptively and proactively reroute communications within the network.

In one example implementation, controller 22 provides integrated control over both network elements 14 and packet-optical transport devices 18 of underlying optical transport network 16 with respect to transport of packet data through the optical links and other equipment. For example, controller 22 may not only control path selection and traffic engineering operations of routing/switching system 15 but may also, as described in detail below, provide integrated control over allocation or utilization of the optical spectrum and wavelengths utilized by each packet-optical transport device 18 within optical transport system 16 that underlie the network elements of routing/switching system 15.

As further described below, in some example embodiments, controller 22 applies real-time, predictable analytics to state information (e.g., congestion levels) received from routing and switching components of network 15 as well as state information (e.g., current draw, power levels, operating temperature) from packet-optical transport devices and other optical components of underling optical transport system 16. Controller 22 applies analytics to identify topology-changing events, including current events and predicted future events. Responsive to identifying or otherwise predicting such events, controller 22 applies integrated, real-time control over both routing/switching system 15 and optical transport system 16.

Application of analytics within integrated controller 22 may be advantageous for many reasons, and may be particularly beneficial in large networks that have become increasingly more complex, virtualized and distributed. For example, as further described, the closed-loop, tightly integrated control architecture of controller 22 may provide more efficient, predictable network behavior in complex networking environments involving the interplay of multiple, layered systems. This disclosure describes techniques for the verification of the network state, the prediction of traffic demands, the prediction of failure or outages in networks, and a closed-loop controller that provides integrated controller over both routing/switching system 15 and optical transport system 16.

Figure 2:
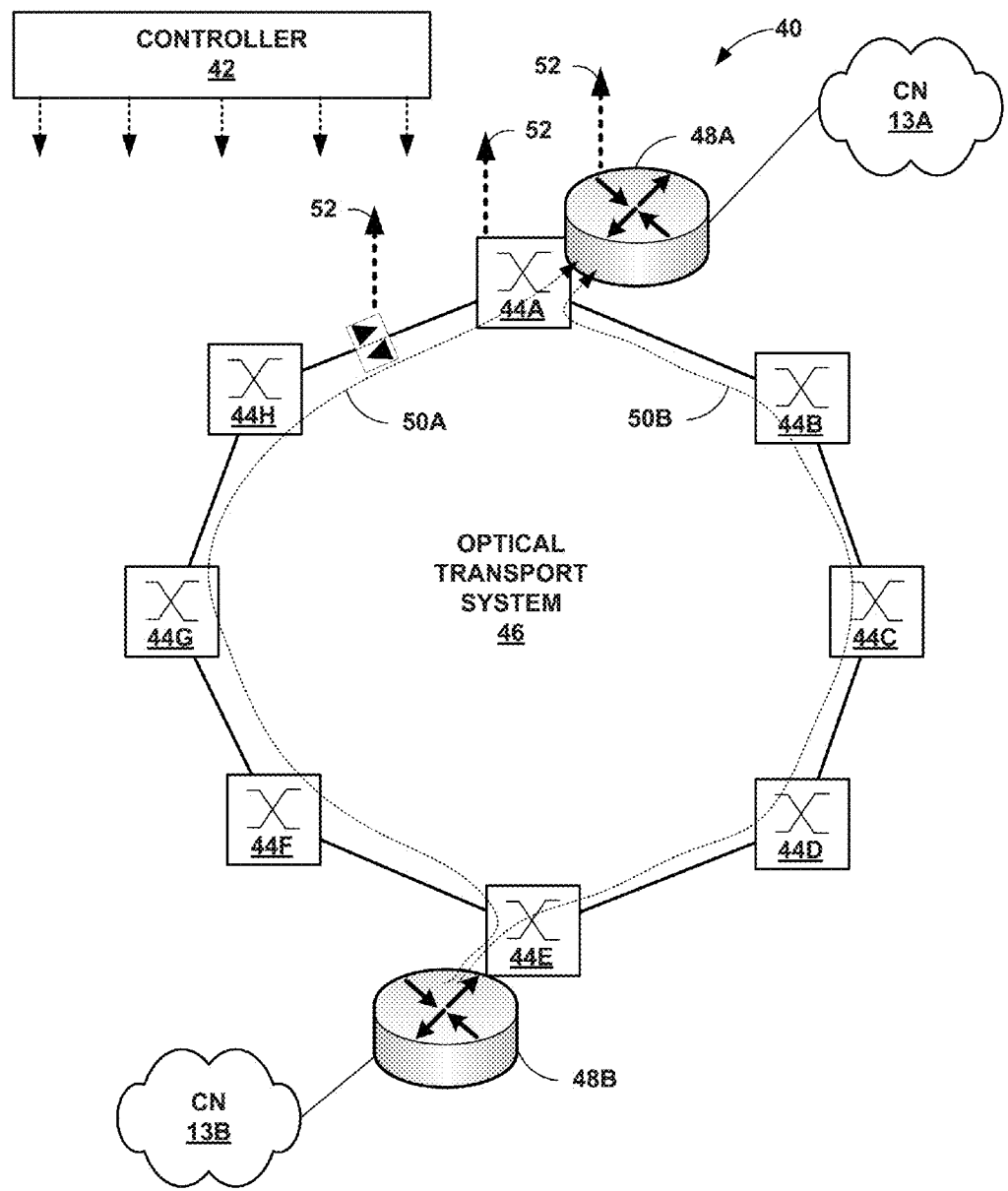
FIG. 2 is a block diagram illustrating an example network in which a controller provides integrated control over allocation or utilization of the optical spectrum and wavelengths utilized by packet-optical transport devices in accordance with techniques described herein.

FIG. 2 is a block diagram illustrating an example network system 40 in which controller 42 provides integrated control over allocation or utilization of the optical spectrum and wavelengths utilized by each packet-optical transport devices 44A-44H (collectively, "44") of an underlying optical transport system in accordance with techniques described herein. In this way, FIG. 2 may be viewed as a more detailed example of FIG. 1 in which controller 42 represents controller 22 and packet-optical transport devices 44 represent a ring topology for packet-optical transport devices 18 of FIG. 1.

As shown in the example of FIG. 2, network system 40 includes a collection of packet-optical transport devices 44 arranged to form an optical transport system 46 having a ring topology. As shown in FIG. 1, routers 48A, 48B operate to provide packet-based network access services for customer networks 13A, 13B, respectively. In this example, optical transport system 46 operates to provide fast packet-based transport of communications between customer networks 13, 15, respectively. Each customer network 13, 15 may comprise a private network and may include local area networks (LANs) or wide area networks (WANs) that comprise a plurality of subscriber devices. Although described with respect to customer networks, optical transport system 46 may be used to provide optical connectivity between any type of packet-based network, such as public networks, core networks, access networks and the like.

FIG. 2 illustrates two bi-directional flows 50A, 50B that ingress and egress at packet-optical transport devices 44A, 44E. Flow 50A is referred to as a primary flow in that the flow represents an allocation of wavelength and spectral bandwidth for carrying optical communications around optical transport 46 between packet-optical devices 44A and 44E via intermediate packet-optical transport devices 44B, 44C and 44D. Flow 50B is referred to as a backup flow in that the flow represents an allocation of wavelength and spectral bandwidth that is reserved for carrying optical communications around optical transport 46 between packet-optical transport devices 44A and 44E in the event primary flow 50A cannot be utilized. As shown, back flow 50B represents reserved wavelengths and spectral bandwidth for carrying optical communications around optical transport 46 between packet-optical transport devices 44A and 44E via intermediate packet-optical devices 44F, 44G and 44H.

As described herein, controller 42 implements real-time control over packet-optical devices 44 to provide fine-grain control over allocation and utilization of the optical spectrum and bandwidth within optical transport system 46. The techniques described herein provide high-speed, highly-scalable wavelength and spectrum assignment highly suited for implementation within centralized controller 42. Controller 42 may, for example, include an analytics engine that applies rules to quickly and efficiently determine wavelength and spectrum assignment at each of packet-optical devices 44. As such, the techniques offer predictable and reproducible behavior that is robust from network and flow changes. Moreover, the techniques are particularly well suited in a closed-loop arrangement where centralized controller 42 continuously controls wavelength and spectrum assignment by applying analytics to status information 52 (e.g., status information 25 of FIG. 1) from monitoring agents distributed and installed within packet-optical transport devices 44 and optical components of optical transport system 46.

In general, the techniques described herein as implemented by controller 42 for wavelength and spectrum assignment may systematically suppress or otherwise avoid adverse optical effects that may otherwise be experienced by optical communication channels between packet-optical devices 44. That is, there are many physical effects that that can destroy or otherwise degrade these optical communication channels, and the techniques applied by controller 42 for allocating portions of the spectrum and assigning wavelengths may avoid or suppress such effects. Example effects include Four Wave Mixing (FWM) and Self-Phase Modulation (SPM) that can lead to optical signal degradation and can also impair neighbored channels. Other physical non-linear optical effects that may be avoided or mitigated by the techniques described herein include, an intra-band Raman effect that pumps the "red" channels in the spectrum by the "blue" channels. The attribute "red" refers to channels that are of longer wavelength than the "blue" channels. The "blue" channels serve as pump source for the "red" channel signals. If the "blue" channels fall away, e.g. due to a fiber cut, equipment outage, the red will not be pumped as much anymore and might not meet a receiver window required by optical components of transport system 46.

In general, controller 42 dynamically controls wavelength and spectrum assignment to suppress or generally avoid optical effects that can degrade communication performance. For example, as described in further detail below, controller 42 provides closed-loop control over dynamic partitioning of the spectral range of optical transport system into channel groups and assigned of the groups to respective packet-optical transport devices 44. Moreover, controller 42 controls assigns of individual wavelengths within each channel group so as to balance channel utilization within the channel group and also to optimize the spectral separation of the channels within the channel group.

Figure 3:
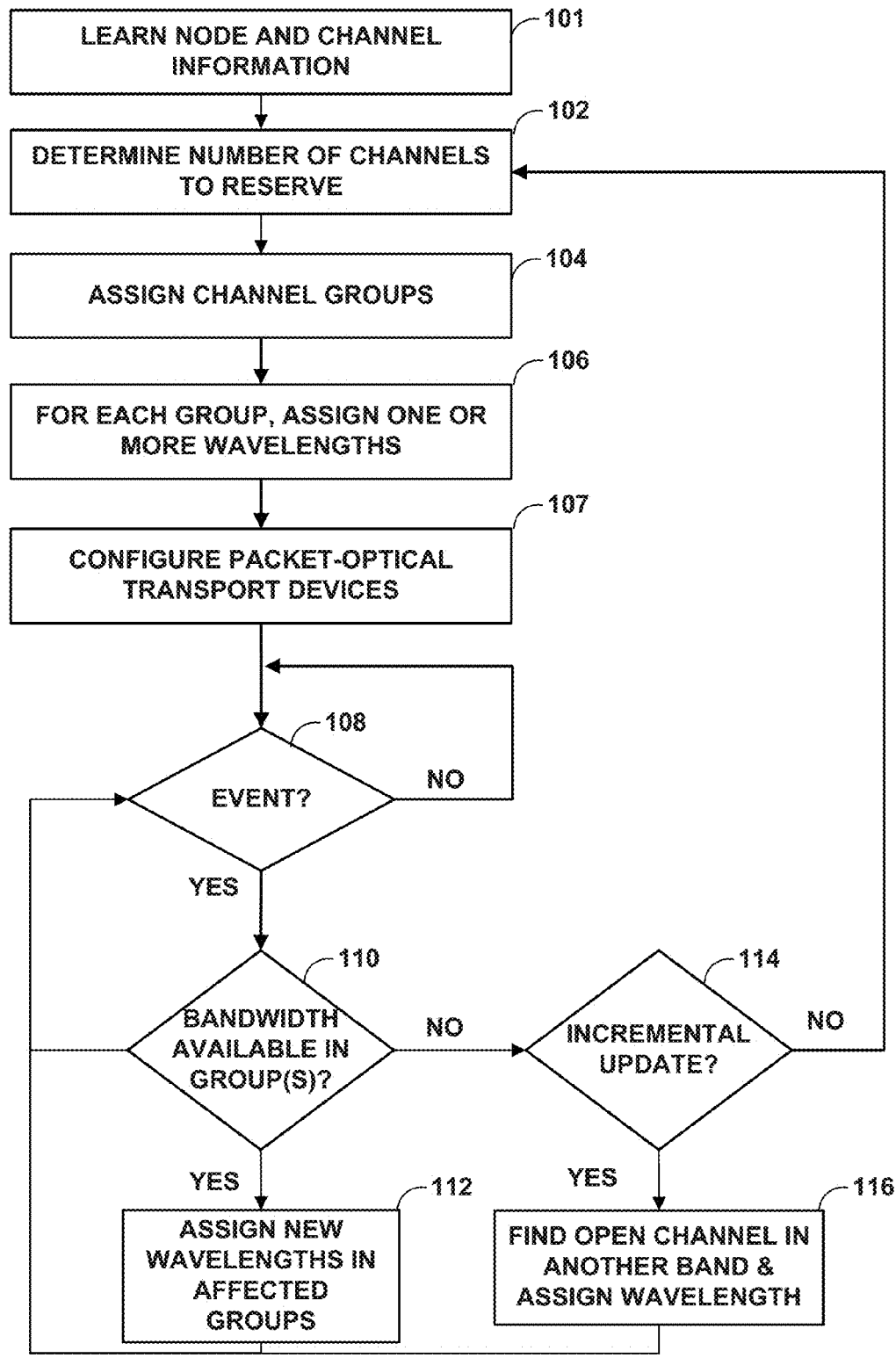
FIG. 3 is a flow diagram illustrating example operation of a centralized controller when allocating channels for nodes in a ring topology and assigning wavelengths to the channels in the respective nodes in accordance with the techniques described herein.

FIG. 3 is a flow diagram illustrating example operation of a centralized controller (e.g., controller 22 of FIG. 1 or controller 42 of FIG. 2) when allocating channels for nodes in a ring topology and assigning wavelengths to the channels in the respective nodes in accordance with the techniques described herein. For purposes of example, FIG. 3 is described with respect to controller 42 of FIG. 2. Moreover, as further described below including by reference to FIG. 7, controller 42 is packet-aware, i.e., aware of packet data units including layer three (L3) routing information, and continuously applies the techniques described herein to map higher-level network service requirements into underlying, physical resources of optical transport system 46.

In general, the flow diagram of FIG. 3 represents a closed-loop control process during which controller 22 monitors and optimizes wavelength allocation among packet-optical transport devices 44 based on monitored status information 52 received from optical transport 46 and routing/switching elements, such as routers 48A, 48B. Controller 42 may, for example, continuously execute the control-loop illustrated in FIG. 3 to control wavelength allocation within the optical transport system 46. As additional examples, controller 42 may execute the control-loop control so as to reallocate wavelength assignment in response to actual or predicted events.

As illustrated in the example of FIG. 3, controller 42 initially learns, discovers or otherwise is configured with information specifying the topology of optical transport system 46 as well as the optical capabilities of the system (101). For example, controller 42 may be configured with or otherwise determine the total spectral range supported by packet-optical transport devices 44, a maximum number of optical channels that can be utilize by optical transport system 46, a maximum number of devices 44 and a minimum spectral distance.

In the example where each of packet-optical transport devices 44 is a tunable or tunable and directionless ROADM, controller 42 operates to distribute the desired maximum channels so as to have at least a minimum spectral distance throughout the total spectrum size. For example, optical transport system 46 may comprises a ring of eight ROADMs supporting a total spectrum of the size of at least 4800 GHz, and a controller 42 may control wavelength allocation so as to maintain at least a minimum spectral separation between channels of 50 GHz or 100 GHz in this example. In many environments, the minimum spectral separate may be specified to account for penalties and signal bandwidth.

When implementing the closed-loop control process of FIG. 2 to assign optical communication channels and allocate wavelength assignments for each of packet-optical transport devices 4, controller 42 utilizes status information 52 from routers 48 to partition the spectral range to reserve groups (blocks) of sequential optical channels the packet-optical transport devices based on traffic demands reported by higher-level routing/switching elements, such as routers 48A and 48B in the example of FIG. 2. State information 52 from routers 48A, 48B provides an indication of current bandwidth consumption based on current traffic flows, e.g., traffic flows 50A, 50B in the example of FIG. 2, and/or may provide an indicator of layer three (L3) congestion at each of the routers.

In particular, controller 42 initially determines the number of optical channels for each of packet-optical transport devices 44 based on the current bandwidth consumption reported by high-level routers 48 (102). In this way, controller 42 determines the number of optical channels, i.e., the group size, for each packet-optical transport device based on current traffic flows experienced by the respective packet-optical transport device. As other examples, controller 42 may assign the number of optical channels to each packet-optical transport device based on historical, current or predicted levels of bandwidth, or combinations thereof, at each respective packet-optical transport device 44. In this way, controller 42 determines the number of channels to reserve for each packet-optical transport device 44 from the overall number of maximum channels supported by optical transport system 46 on a pro-rata (i.e., weighted) basis based on demand for bandwidth at each of the packet-optical transport devices. As further described below, the terms optical communication channel and wavelength are used differently in that an optical communication channel is a logical construct representing a "unit" of the maximum number of optical communication channel that can be allocated within the spectral range supported by optical transport system 46 and, in particular, may or may not have an assigned wavelength. In contrast, a wavelength represents a specific location within the spectrum at which an optical communication may be assigned for communication.

After determining the number of optical channels to reserve for each packet-optical transport device 44 from the maximum number of channels, controller 42 assigns a specific set of channels (also referred to as a "channel group") to each respective packet-optical transport device until all of the maximum number of channels are reserved (104).

As a simple example, controller 42 may determine that optical transport system 46 supports a maximum of forty channels to be allocated equally to the eight packet-optical transport devices 55 such that each packet-optical transport device is to be allocated five channels. As further described below, controller 42 may designate the forty communication channels with identifiers 1-40 and may assign optical communications channels 1-5 to packet-optical transport device 44A, channels 6-10 to packet-optical transport device 44B, and so forth. In some examples, the groups of channels assigned to packet-optical transport device 44 may not be in sequential order, and the channels within a given channel group may not necessarily be adjacent in the spectral domain.

After controller 42 assigns a specific set of optical communication channels to each packet-optical transport device 44, controller 42 assigns the wavelengths to one or more optical communication channels within each of the groups (106). That is, for each packet-optical device 44, controller 22 assigns individual wavelengths to the communication channel that are to be utilized by the respective device, either for carrying primary flows or backup flows. Any remaining optical communication channels of a channel group may not necessarily be assigned respective wavelengths. That is, in any of the channel groups, some of the optical communication channels may be assigned respective wavelengths for primary or backup data communications (e.g., current packet flows 50A, 50B) while other channels of the groups may remain unutilized without wavelength assignment. Moreover, for any given channel group, controller 22 assigns the necessary wavelengths in that group to establish to balance the utilized communication channel across the portion of the spectrum associated with the channel group. In other words, for any given channel group, controller 42 may assign the wavelengths needed by that channel group in a manner that in general balances the network traffic level around a center of the spectral region associated with that channel group. In other words, controller 42 controls allocation of wavelengths for a given channel group so as to equally distribute network traffic throughout the spectral region associated with the group and to balance traffic around a "center of gravity" of a given packet-optical transport device, where the "center of gravity" can be viewed as the center communication channel within the set of communication channels associated with a given packet-optical transport device 44.

For example, if for a given channel group only a single wavelength is to be assigned, the wavelength is assigned so as to position the first channel in the middle of the group of channels. For channel groups having an odd number of wavelengths to assign, the remaining wavelengths are sequentially allocated around the center wavelength so as to maintain the balance of network traffic around the center channel within the channel group and to optimize the spectral separation of the channels within the channel group. For channel groups having an even number of wavelengths to assign, pairs of wavelengths are assigned equidistant around the center wavelength of the portion of the spectrum designated for the channel group.

Figure 4:
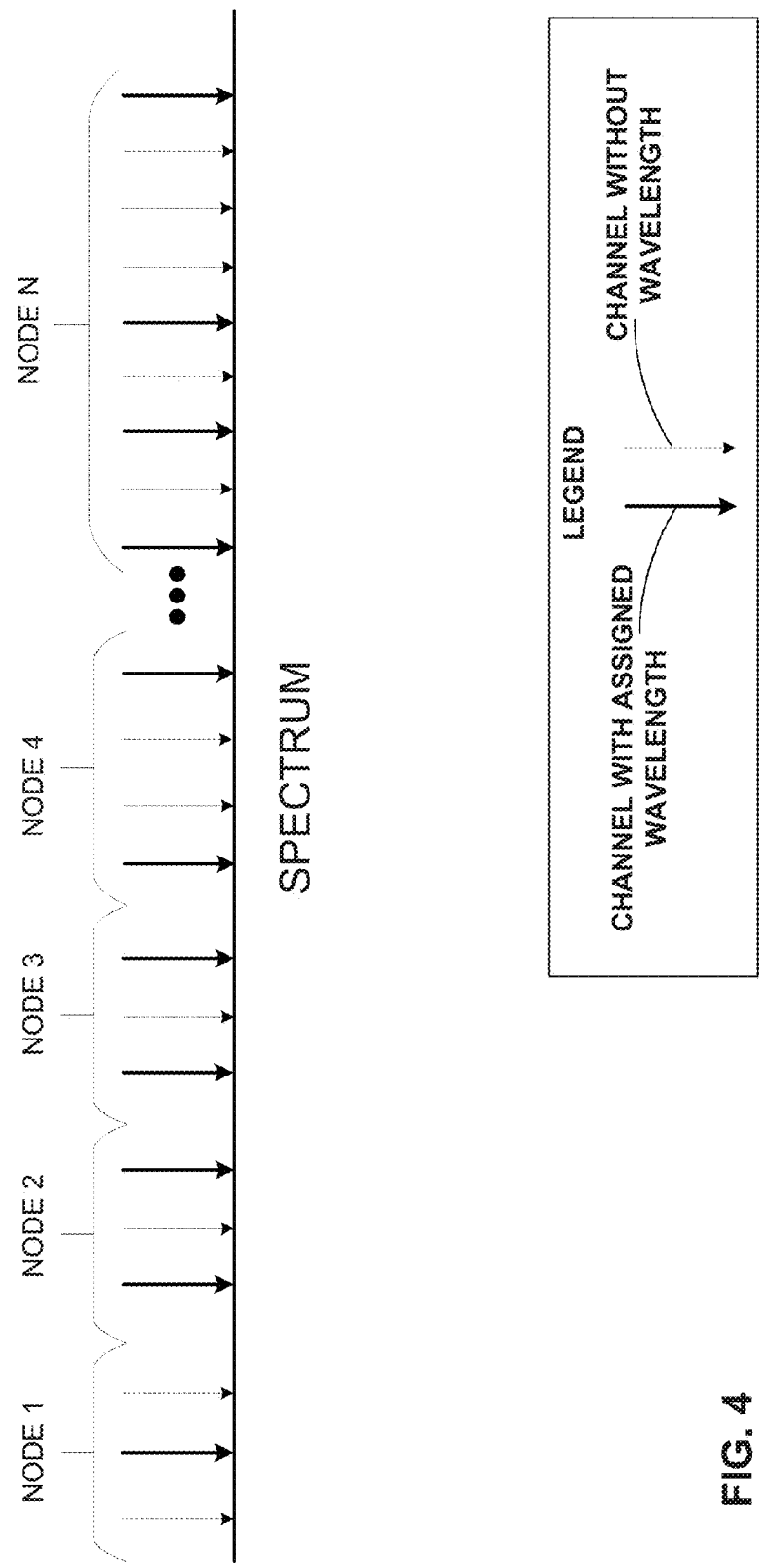
FIG. 4 is a graph illustrating example wavelength assignment in an optical transport system having N packet-optical transport devices.

To illustrate, FIG. 4 is a graph illustrating example wavelength assignment in an optical transport system having N packet-optical transport devices ("nodes"). In this example, $NODE_1$, $NODE_2$ and $NODE_3$ are allocated channel groups having three communication channels, $NODE_4$ is allocated a channel group having four communication channels and $NODE_N$ is allocated a channel group having nine communication channels. For $NODE_1$, only a single wavelength is assigned and, therefore, is assigned in the spectral portion associated with $NODE_1$. For $NODE_2$, two wavelengths are assigned of the three optical communication channels of the group. As such, the controller assigns a pair of wavelengths equidistant from the center wavelength of the spectral portion associated with $NODE_1$, thereby maintaining a balanced "weighting" with that portion of the spectrum. Similarly, for $NODE_3$, two wavelengths are assigned of the three optical communication channels of the group. For $NODE_4$, the controller has a reserved a channel group having four optical channels and has assigned wavelengths to only two of the optical channels. In this example, a pair of wavelengths have been assigned to the first and last channel of the four channels of the group. Alternatively, the pair of wavelengths could have been assigned to the second and third optical channels and a weighted balance around the center wavelength of the spectral portion associated with $NODE_4$ would still have been maintained. For $NODE_N$, the controller has reserved a channel group having nine optical communication channels and assigned wavelengths to the first, third, fifth, seventh and ninth communication channels, which indicates that $NODE_N$ may be experiencing, or is predicted to experience, particularly heavy traffic flows relative to the other nodes. In this way, as illustrated in FIG. 4, the controller maintains balanced, intra-node distribution of assigned wavelengths yet maintains a minimum, threshold spectral separation between all individual optical communications channels for the packet-optical transport devices.

Returning to the flowchart of FIG. 3, once controller 42 has assigned the wavelengths to the communication channels, controller 42 outputs commands to packet-optical transport devices 44 to configure the wavelengths utilized by each of the optical interfaces of the devices (107).

After configuring packet-optical transport devices 44, controller 42 monitors state information 52 reported by or otherwise received from routers 48 and underlying components of optical transport system 46. More specifically, controller 42 monitors state information 52, such as current network traffic levels, power consumption, current draw, and the like, and applies analytics to identify or predict topology-changing events (108). For example, controller 42 may apply analytics to state information 52 to determine that one or more packet-optical transport devices 44 requires additional bandwidth. As another example, controller 42 may determine that, based on state information 52, one or more optical components of optical transport system 46 is likely to or has already failed and, as a result, traffic is to be routed around the component, thereby increasing the traffic load on certain packet-optical transport devices 44 while decreasing the traffic load on others.

Responsive to such events, controller 42 first determines whether the existing channel groups as previously allocated by the controller are sufficient to handle the new bandwidth requirements of each of packet-optical transport devices 44 (110). That is, for any affected channel groups needing additional bandwidth, controller 42 determines whether a sufficient number of communication channels having unassigned wavelengths exist in the groups. If so, controller 42 applies the process described above (e.g., step 106 of FIG. 3) to assign one or more additional wavelengths (112). At this time, controller 42 may reassign all of the wavelengths in the affected channel groups and the corresponding packet-optical transport devices according to the process described above so as to maintain balanced wavelength distribution throughout the channel groups.

If, however, controller 42 determines that there are an insufficient number of open communication channels in the affected communication groups (e.g., all communication channels of the group have been assigned wavelengths), controller 42 may first determine whether an incremental update to the channel group configuration and wavelength assignment can be performed by at least temporarily reassigning one or more unused communication channels from other groups to the affected channel group (114). If so, controller 42 reassigns one or more communication channels from one or more other channel groups to the channel groups need more bandwidth (116). At this time, controller 42 applies the process described above (e.g., step 106 of FIG. 3) to newly assign all of the wavelengths in the channel group having the increased number of communication channels to maintain balanced wavelength distribution throughout the channel group, and configures the corresponding packet-optical transport device to begin forwarding optical communications in according to the assigned wavelengths.

In some situations controller 42 may determine that an incremental update to the channel configuration groups and wavelength assignment is not appropriate (NO of 114). For example, controller 42 may determine that there are no other open channels in other packet-optical transport devices 44. In some examples, such as events that would require significant changes to the current channel group and wavelength assignments, controller 42 may determine that it is more appropriate to re-initiate the closed-loop control process so as to entirely recalculate the channel communication groups and wavelength assignments (NO of 114). If so, controller 42 repeats the closed-loop process described above, taking into account the detected topology-changing events.

The following sections describe in further detail example implementations of the closed-loop communication channels and wavelength assignment operation performed by a controller, such as controllers 22, 42, in accordance with the techniques described herein. Table 1 lists notations and definitions that are used throughout the following sections.

TABLE 1

| Notation | Description |
| --- | --- |
| Maximum number of wavelength channels | $N_{max}$ |
| Maximum number of Nodes | $Nodes_{max}$ |
| Node identifier | $Node_i$ |
| Total traffic between $Node_i$ and $Node_j$ | $T_{ij}$ [Gb/s] |
| Flow between $Node_i$ and $Node_j$ with attributes A | $F_{ij}^a$ [Gb/s] |
| Lamda between $Node_i$ and $Node_j$ at wavelength K, port L, and shape S | $Lamda_{i,j,k,l,s}$ |
| Total number of channels from node I to node J | $T_{ij}$ |
| C-band of total spectral width | C [THz] |
| Spectral bandwidth of a single channel | c [THz] |
| Spectral distance between channels | d [THz] |
| Maximum channel number of DWDM system | $Ch_{max}$ |
| Group of channel added/dropped at $Node_i$ | $Ch_i$ |
| Total number of channels added/dropped at Site I | $\#Ch_i$ |
| Minimum channel at $Node_i$ | $Ch_{i,min}$ |
| Maximum channel at $Node_i$ | $Ch_{i,max}$ |
| Minimum assigned wavelength at $Node_i$ | $n_{i,min}$ |
| Maximum assigned wavelength at $Node_i$ | $n_{i,max}$ |
| Bandwidth of a channel with spectrum S | $B_s$ [GHz] |
| Group of Reserved Channels at $Node_i$ | $R_i$ |

Using this nomenclature, a relationship can be defined between the total spectral width C and the spectral distance between channels d as:

$$Ch_{max} = C/d,$$

where $Ch_{max}$ is the maximum number of channels with a constant or uniform spectrum.

The spectral bandwidth c for each, single channel can be represented as:

$$C/c > Ch_{max}.$$

Some optical transport systems may be implemented to allow for the least amount of penalties across packet-optical devices due to filter effects (e.g., bandwidth narrowing).

Moreover, the closed-loop control process of FIG. 3 can represented as assigning one or more wavelengths from every node N_i with i=1, . . . , N_max, wherein each node represents a respective one of packet-optical transport devices 44.

As discussed above, the number of optical channels, i.e., the channel group size, may be determined for each node in a weighted manner based on current or predicted traffic flows. According to these expressions, in one example implementation, for each node N_i, the total number of allocated channels $\#Ch_i$ for that node N_i may be determined based on a sum of all the flows from that node N_i to the nearest edge side N_e in relation to the sum of all flows from all the nodes and multiplied by the maximum number of channels Ch_max. That is, the number of optical channels, i.e., the channel group size, for each respective node may be determined by the formula:

$$\#Ch_i = Roundup\left(\frac{\text{Bandwidth required at } Node_i}{\sum_{x=1}^{j} \text{Bandwidth required at } Node_x} * Ch_{max}\right).$$

The bandwidth requirements for a given flow may be selected as the maximum value of a given flow over a configurable time period. The shortest average time of configurable may, in some implementations, be limited to a defined response time of the controller, i.e., the time typically required by the controller to recompute and reassign channel group assignments and wavelengths.

Reservation of channel groups R_i at each node N_i may be expressed as a set of channel identifiers, which each channel group represented by a unique channel group identifier. In one example, the controller logically arranges the channel groups in a sorted order based on total number of channels within each group. In some examples, the controller arranges the channel groups in declining order such that the channel group having the largest number of channels is first in the order. In this example, the controller may allocate the largest channel group to the red portion of the optical spectrum, the second largest group adjacent to the first and so on. This ordering of the groups may, for example, allow the controller to help ensure that in case of a node or link failure survival for this channel group is guaranteed. This survival of a wavelength signal depends on many factors including but not limited to response time of the amplifier power control, the power and distribution of the wavelengths in the signal spectrum (as wavelength-signals pump wavelength signals via the "in-band" Raman-effect, the receiver windows and other effects specific to the DWDM optical system. An example is the allocation of a band with a lot of traffic into the "middle" of a spectrum to guarantee the lowest potential influence of the Raman intra-band effect. A variety of numbering schemes for individual channel numbers can be used, such as the standardized channel numbering scheme proposed in ITU-T G.694.1: "SERIES G: TRANSMISSION SYSTEMS AND MEDIA, DIGITAL SYSTEMS AND NETWORKS," International Telecommunication Union (ITU), 2012, incorporated herein by reference, or any numbering scheme with declining wavelength or increasing optical frequency.

Using this nomenclature, example implementation of wavelength assignment within each channel group may be expressed according to the following equations. For example, the center of gravity (CG) of given channel group R_i may be calculated as:

$$CG = \text{Rounddown}\left(\frac{Ch_{i,max} + Ch_{i,min}}{2}\right),$$

where $Ch_{i,max}$ and $Ch_{i,min}$ are the highest and lowest unique identifier, respectively, for the channels in the channel group assigned to the node. In general, the controller may apply techniques that consistently rounds up or down.

Within any given channel group, the separation distance (SD) in terms of a number of channels separating the wavelengths to be assigned in that channel group may be calculated as:

$$SD = \text{Rounddown}\left(\frac{Ch_{x,max} + Ch_{x,min}}{k+1}\right),$$

where k equals the number of channels in the group that will have an assigned wavelength in the given node. Like the center of gravity formula, the controller may round up or down so long as the controller rounds the function consistently.

For a channel group R_i associated with a respective node N_i, systematic wavelength assignment to the channels in the group in a manner that maintains a balance around the center of gravity CG may be expressed as an optimization of:

$$F(n_{i,j}) = \frac{1}{\#Ch_i} \sum_{k=n_{i,min}}^{n_{i,max}} n_{i,k},$$

such that:

$$F(n_{i,j}) - \frac{Ch_{i,max} + Ch_{i,min}}{2} \sim 0,$$

where $n_{i,j}$ represents the wavelength to be selected at wavelength j at site i. In situation where there are multiple solutions to this model, the controller may determine which solution to select by maximizing the separation distance between the channels within the channel group, as described above.

Moreover, several example scenarios are now described to illustrate the closed-loop channel group allocation and wavelength assignment control process.

Example 1

In a first example scenario, consider an example network in which the optical transport system has eight packet-optical transport devices (referred to as $Node_1$-$Node_8$ where $Nodes_{max}$=8). For purposes of this example, consider the following assumptions:

maximum number of optical communication channels is 80 ($N_{max}$=80),
total bandwidth B per optical channel is 100 Gb/s,
determined demand (current or predicted) for bandwidth for $Node_1$, $Node_2$, $Node_4$, $Node_5$, $Node_6$, and $Node_8$ is 10 Gb/s per node, initial demand for bandwidth for $Node_3$ and $Node_7$ is 20 Gb/s per node, and $Node_1$ is the only edge packet-optical transport device 44 such that $Node_1$ is the sole entrance and exit point, and No channel(s) will be reserved as backup flows.

Table 2 illustrates an example resultant traffic matrix T_ij with i=1 . . . 8 and j=1 . . . 8, where i represents the sending node and j represents the receiving node. In Table 2, units are shown in Gigabits per seconds.

TABLE 2

| Node T_ij | 1 | 2 | 3 | 4 | 5 | 6 | 7 | 8 | Total local add | Total express at site (counter-clock) | Total express at site (clock-wise) |
|---|---|---|---|---|---|---|---|---|---|---|---|
| 1 | 10 | 10 | 20 | 10 | 10 | 10 | 20 | 10 | 10 | 0 | 90 |
| 2 | 10 | 0 | 0 | 0 | 0 | 0 | 0 | 0 | 10 | 10 | 70 |
| 3 | 20 | 0 | 0 | 0 | 0 | 0 | 0 | 0 | 20 | 20 | 60 |
| 4 | 10 | 0 | 0 | 0 | 0 | 0 | 0 | 0 | 10 | 40 | 50 |
| 5 | 10 | 0 | 0 | 0 | 0 | 0 | 0 | 0 | 10 | 50 | 40 |
| 6 | 10 | 0 | 0 | 0 | 0 | 0 | 0 | 0 | 10 | 60 | 20 |
| 7 | 20 | 0 | 0 | 0 | 0 | 0 | 0 | 0 | 20 | 70 | 10 |
| 8 | 10 | 0 | 0 | 0 | 0 | 0 | 0 | 0 | 10 | 90 | 0 |
| Total | 100 | 10 | 20 | 10 | 10 | 10 | 20 | 10 | 100 | | |

In this example, the controller applies the closed-loop channel allocation and wavelength techniques described herein first determine the total number of optical channels to reserve for each node, the results of which are shown in the column 3 of Table 3. Next, the controller assigns the channel groups to each node, resulting in the channel groups listed in column 4 of Table 3.

Since in this example, only one of the 100 Gb/s optical channels need be utilized per node without any backup flows being reserved, controller 42 assigns the wavelength to the middle channel in each group of channels. Taking $Node_3$ as an example, the maximum channel ($Ch_{x,max}$) assigned to $Node_3$ is channel 16 and the minimum channel ($Ch_{x,max}$) assigned to $Node_3$ is channel 1. The center of gravity for the channel group is determined as described above to be channel 8. In this way, the controller assigns wavelengths are for each node $Node_x$ as shown in the fifth column of Table 3.

TABLE 3

| Node_i | Bandwidth Requirement | # Channels Reserved | Channels Assigned (R_i) | Initial Wavelength Assigned to Channel(s) |
|---|---|---|---|---|
| 1 | 10 Gb/s | 8 | $R_1$ = 33-40 | 36 |
| 2 | 10 Gb/s | 8 | $R_2$ = 41-48 | 44 |
| 3 | 20 Gb/s | 16 | $R_3$ = 1-16 | 8 |
| 4 | 10 Gb/s | 8 | $R_4$ = 49-56 | 52 |
| 5 | 10 Gb/s | 8 | $R_5$ = 57-64 | 60 |
| 6 | 10 Gb/s | 8 | $R_6$ = 65-72 | 68 |
| 7 | 20 Gb/s | 16 | $R_7$ = 17-32 | 24 |
| 8 | 10 Gb/s | 8 | $R_8$ = 73-80 | 76 |

Example 2

In a second example scenario, assume the same network configuration as the prior example but that network traffic has grown in a linear fashion for all eight nodes (to ten times the original bandwidth requirements). Thus, for purposes of this example, consider the following assumptions:

maximum number of optical communication channels is 80 ($N_{max}$=80), total bandwidth B per optical channel is 100 Gb/s, determined demand (current or predicted) for bandwidth for $Node_1$, $Node_2$, $Node_4$, $Node_5$, $Node_6$, and $Node_8$ is 100 Gb/s per node, determined demand (current or predicted) for bandwidth for $Node_3$ and $Node_7$ is 200 Gb/s per node, and $Node_1$ is the only edge packet-optical transport device 44 such that $Node_1$ is the sole entrance and exit point, and No channel(s) will be reserved as backup flows.

Table 4 illustrates an example resultant traffic matrix T_ij with i=1 . . . 8 and j=1 . . . 8, for this example.

TABLE 4

| Node T_ij | 1 | 2 | 3 | 4 | 5 | 6 | 7 | 8 | Total local add | Total express at site (counter-clock) | Total express at site (clock-wise) |
|---|---|---|---|---|---|---|---|---|---|---|---|
| 1 | 100 | 100 | 200 | 100 | 100 | 100 | 200 | 100 | 100 | 0 | 900 |
| 2 | 100 | 0 | 0 | 0 | 0 | 0 | 0 | 0 | 100 | 100 | 700 |
| 3 | 200 | 0 | 0 | 0 | 0 | 0 | 0 | 0 | 200 | 200 | 600 |
| 4 | 100 | 0 | 0 | 0 | 0 | 0 | 0 | 0 | 100 | 400 | 500 |
| 5 | 100 | 0 | 0 | 0 | 0 | 0 | 0 | 0 | 100 | 500 | 400 |
| 6 | 100 | 0 | 0 | 0 | 0 | 0 | 0 | 0 | 100 | 600 | 200 |
| 7 | 200 | 0 | 0 | 0 | 0 | 0 | 0 | 0 | 200 | 700 | 100 |
| 8 | 100 | 0 | 0 | 0 | 0 | 0 | 0 | 0 | 100 | 900 | 0 |
| Total | 1000 | 100 | 200 | 100 | 100 | 100 | 200 | 100 | 1000 | | |

Due to the linear growth for all nodes in this example, the relative bandwidth between the nodes is the same as the prior example. Thus, the number of channels reserved per node and the specific group of channels assigned to each node does not change. Since the total bandwidth per channel is 100 Gb/s, $Node_1$, $Node_2$, $Node_4$, $Node_5$, $Node_6$, and $Node_8$ can still accommodate the entire bandwidth via a single optical communication channel. However, $Node_3$ and $Node_7$ cannot accommodate the entire bandwidth in a single optical communication channel because the total bandwidth used by $Node_3$ and $Node_7$ exceeds the capacity of a single optical communication channel. As such, when implementing the control process described herein, the controller updates that allocation and wavelength scheme for the network to assign additional wavelengths to communication channels reserved for $Node_3$ and $Node_7$.

For example, the controller may assign maintain the initial wavelengths assigned to $Node_3$ and $Node_7$ so as to minimize disruption and of communication flows. As such, the controller may assign not one but two additional wavelengths within the channel groups associated with $Node_3$ and $Node_7$, thereby maintaining a balance around the initial wavelengths already assigned within the group. As such, for $Node_3$, the controller may assign wavelengths to communication channel 4 and communication channel 12 around the initial communication channel 8 currently in use. Other examples exist for $Node_3$, such as communication channels 3, 13 or 2, 14, which differ only is spectral spacing. The controller may be programmed to select the particular pair of wavelengths to assign based on the boundaries and optical link control qualities of the individual packet-optical transport system. The controller similarly assigns an additional pair of wavelengths within the channel group allocated to $Node_7$, such as communication channels 20, 28 around the initial communication channel 24 currently in use. Results of this example are reflected in Table 5.

| $Node_i$ | Bandwidth Requirement | # Channels Reserved | Channels Assigned ($R_i$) | Initial Wavelength Assigned to Channel(s) |
|---|---|---|---|---|
| 1 | 100 Gb/s | 8 | $R_1$ = 33-40 | 36 |
| 2 | 100 Gb/s | 8 | $R_2$ = 41-48 | 44 |
| 3 | 200 Gb/s | 16 | $R_3$ = 1-16 | 4, 8, 12 |
| 4 | 100 Gb/s | 8 | $R_4$ = 49-56 | 52 |
| 5 | 100 Gb/s | 8 | $R_5$ = 57-64 | 60 |
| 6 | 100 Gb/s | 8 | $R_6$ = 65-72 | 68 |
| 7 | 200 Gb/s | 16 | $R_7$ = 17-32 | 20, 24, 28 |
| 8 | 100 Gb/s | 8 | $R_8$ = 73-80 | 76 |

Alternatively, when assigning additional wavelengths to $Node_3$ and $Node_7$, the controller may elect to rebalance the wavelengths with the respective communication channels. For example, since only two wavelengths are required by $Node_3$ and $Node_7$ in this example, the controller may eliminate use of the wavelength positioned at the center of gravity within each channel group and assign the wavelengths in a balanced manner. For example, for $Node_3$, the controller may assign wavelengths to communication channel 4 and communication channel 12 and remove the initial wavelength assignment to communication channel 8, thereby maintaining balanced wavelength assignment within the group yet increasing spectral separation. In selecting between the two approaches, the controller may maintain at least a threshold amount of excess bandwidth (e.g., at least 20% or at least 10 GB/s, etc.) relative to the determined bandwidth requirements for the Node. In this example, since both $Node_3$ and $Node_7$ have, or are predicted to have, bandwidth requirements of 100 Gb/s, which matches the bandwidth capacity of a single optical communication channel, the controller may elect to allocate three wavelengths within the channel group, as described above.

This example illustrates another advantage of the integrated controller described herein, such as the controller further described below with respect to FIG. 7. As the overall control system has network-services awareness, the controller can act to roll-over the traffic from one wavelength to another while the initial wavelength can be moved. This allows a re-setting of the wavelength assignment within the optical transport network while not interrupting the packet-based traffic flow through the routing/switching network at all. The control architecture described herein having packet-awareness and closed loop control over the optical transport system in combination with analytics can flawlessly and efficiently deliver a Make-before-break (MBB) solution in this manner.

Example 3

In a third example scenario, assume the same network configuration as the prior examples but that network traffic has now grown in a non-linear fashion for all eight nodes from the state presented in example. Thus, for purposes of this example, consider the following assumptions:

maximum number of optical communication channels is 80 ($N_{max}$=80), total bandwidth B per optical channel is 100 Gb/s, determined demand (current or predicted) for bandwidth for $Node_1$, $Node_4$, $Node_5$, and $Node_8$ is 100 Gb/s per node, determined demand (current or predicted) for bandwidth for $Node_2$ and $Node_6$, is 1700 Gb/s per node, determined demand (current or predicted) for bandwidth for $Node_3$ and $Node_7$, is 1700 Gb/s per node, and Node₁ is the only edge packet-optical transport device 44 such that Node₁ is the sole entrance and exit point, and No channel(s) will be reserved as backup flows.

Table 4 illustrates an example resultant traffic matrix T_ij with i=1 . . . 8 and j=1 . . . 8, for this example. Columns shown the accumulative bandwidth requirements around the ring have been dropped for simplicity.

| Node T_ij | 1 | 2 | 3 | 4 | 5 | 6 | 7 | 8 | Total local add |
|---|---|---|---|---|---|---|---|---|---|
| 1 | 100 | 200 | 1700 | 100 | 100 | 200 | 1700 | 100 | 4000 |
| 2 | 200 | 0 | 0 | 0 | 0 | 0 | 0 | 0 | 200 |
| 3 | 1700 | 0 | 0 | 0 | 0 | 0 | 0 | 0 | 1700 |
| 4 | 100 | 0 | 0 | 0 | 0 | 0 | 0 | 0 | 100 |
| 5 | 100 | 0 | 0 | 0 | 0 | 0 | 0 | 0 | 100 |
| 6 | 200 | 0 | 0 | 0 | 0 | 0 | 0 | 0 | 200 |
| 7 | 1700 | 8 | 0 | 0 | 0 | 0 | 0 | 0 | 1700 |
| 8 | 100 | 0 | 0 | 0 | 0 | 0 | 0 | 0 | 1100 |
| Total | 4200 | 200 | 1700 | 100 | 100 | 200 | 1700 | 100 | 4000 |

Responsive to detecting the non-linear changes to bandwidth requirements, the controller determines that the current allocation of communication channels is insufficient to support the bandwidth requirements for at least Node₃ and Node₇. As such, the controller determines whether an incremental update to the channel group configuration and wavelength assignment can be performed by at least temporarily reassigning one or more unused communication channels from other groups to the affected channel group (see block 114 of FIG. 3).

In this way, the controller may elect to allocate bandwidth from a packet-optical transport device (node) with excess capacity to an over-extended packet-optical transport device (i.e., where demand for bandwidth exceeds capacity (e.g., Node₃ and Node₇)). An incremental update may be beneficial, in that the controller may be able to allocate bandwidth without reprogramming the entire packet-optical transport system. For example, in an incremental update, the controller may identify any candidate nodes with open or unused channels, i.e., currently without wavelength assignment, that can be re-assigned to the over-extended node. Controller 42 may select which candidate node to re-allocate bandwidth from based on which node has the most open channels 24, which candidate node has the least network traffic, which candidate node has experienced the least growth in bandwidth demand, or other factors.

In this example scenario, the controller may determine that Node₁, Node₄, Node₅, and Node₈ are candidate nodes for re-assigning communication channels because each are tied for having the most number of unused channels (seven) and each currently have the lowest bandwidth requirements (100 Gb/s). In some examples, controller 42 may re-assign a subset of the needed channels from each of the candidate nodes, thereby minimizing any future impact on any given node.

Alternatively, the controller may determine that an incremental update to the channel configuration groups and wavelength assignment is not appropriate (see NO branch of block 114 of FIG. 3). For example, the controller may be programmed configuration data specifying a maximum threshold number of communication channels to reassign without re-initiate the closed-loop control process so as to entirely recalculate the channel communication groups and wavelength assignments. Assuming, for purposes of example, the threshold number is configured to one (1), the controller in this example would determine that at least two communication channels (one for each of Node₃ and Node₇) are needed and, therefore, bypass the incremental update and instead perform a new channel group allocation and wavelength assignment for all nodes.

Figure 5:
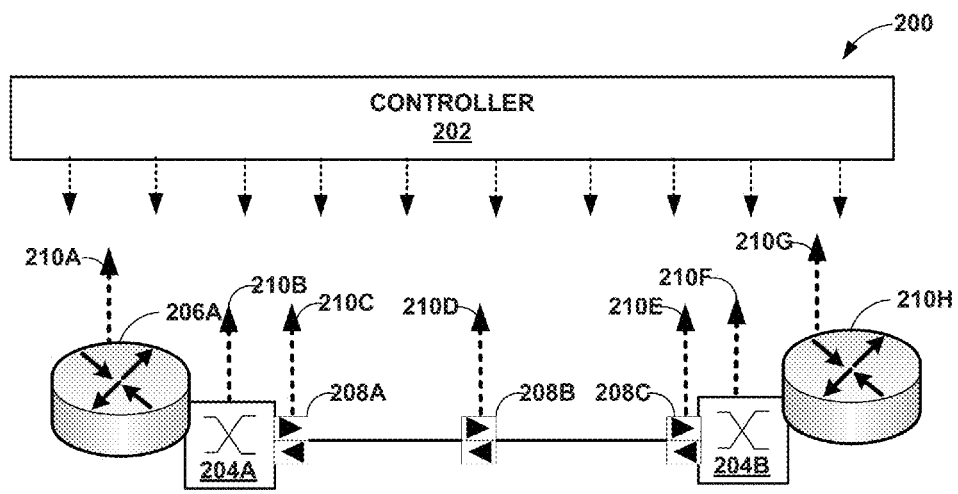
FIG. 5 is a block diagram illustrating an example centralized controller network device that operates in accordance with the techniques of this disclosure.

FIG. 5 illustrates a portion of a network 200 in which controller 202 provides integrated control packet-optical transport devices 204A, 204B of an underlying optical transport system in accordance with techniques described herein. FIG. 5 may be viewed as detailed portion of the examples of FIG. 1 or FIG. 2, and controller 202 may represents controllers 22, 42 described above.

In the example of FIG. 5, controller 202 provides centralized, closed-loop control and management of routers 206A, 206B, and packet-optical transport devices 204A, 204B of the underlying packet-optical transport system. Controller 202 continuously controls wavelength and spectrum assignment within packet-optical transport devices by applying analytics to status information 210 from monitoring agents distributed and installed within routers 206 as well as packet-optical transport devices 204 and optical components 208 of the underlying optical transport system.

As described herein, controller 202 processes status information 210 with an internal analytics engine and, using higher-level topology information, responds to the status information to map packets into network 200 including routers 206 and transport resources associated with packet-optical transport devices 204. For example, in one example implementation, controller 210 provides closed-loop environment having a real-time analytical engine that predicts outages based on status information 210. The analytics engine may predicts events and, for events for which a likelihood of occurrence that exceeds defined thresholds, reconfigures the router and switching (L3/L2) devices and/or reconfigures the spectral allocation and wavelength assignments of the underlying analog optical transport devices. In this way, controller 202 may combine features of advanced L3/L2 software defined networking (SDN) controller with an analog control architecture for controlling the underlying analog optical transport system, where the real-time control for both of these systems is driven by predictable analytics. As such, the analytical engine of controller 202 is responsive to real-time status information 210 and allows controller 202 to optimize the routing, wavelength and spectrum assignment (RWSA) implemented by the combination of the routing/switching system and the underlying optical transport system.

For example, packet-optical devices 204A, 204B typically include advanced optical transmit and receive interfaces having multiple components, any of which may be monitored by an internal monitoring agent that determines and communicates respective status information 210B, 210F to controller 202. Packet-optical devices 204A, 204B typically may, for example, include optical mixers, optical multiplexers, optical amplifiers and other components that communicate optical signals, any of which may be monitored by internal monitoring agents of the packet-optical devices that determine and communicate respective status information 210B, 210F to controller 202. Moreover, in the example of FIG. 5, optical transport system of FIG. 5 includes a plurality of optical components 208A-208C for transmission of optical packet data along an optical link between packet optical devices 204A, 204B. Example optical components 208 include amplifiers, transponders, OTTs, repeaters and other equipment. Each of optical components 208A-208C provide respective status information 210C, 201D and 210 E.

Further, routers 206A, 206B may include advanced optical transmit and receive interfaces having multiple components for converting between digital and optical packet data. For example, routers 206A, 206B may have optical transmitters having lasers, local oscillators, optical modulators, optical mixers, amplifiers, modems and other components. Routers 206A, 206B may similarly have optical receivers having timing recovery units, equalizers, analog to digital converters and other components. Any of these components of routers 206A, 206B may be monitored by internal monitoring agents that determine and communicate respective status information 210A, 210G to controller 202.

In one example, one or more of status information 210A-210G take the form of communications that convey operating parameters of one or more components, such as power consumption, current draw, voltage levels, operating temperature and other parameters measured from electrical or optical components within the respective devices. Analytical device-specific agents may be used to predict the outage based on measurements of the behavior of an individual device, and these agents can be associated/adapted to their special properties.

The analytical engine of controller 202 applies rules based on either the current measurements or based on a time-series of current and past measurements and computes probabilities of failures or other compromising events based on the operating conditions measured at the various components, thereby predicting future outages or compromised states associated with network resources within network 200. Based on the analytics, a path computation module of controller 200 high-level traffic engineering and topology information associated with the routing and switching system (e.g, routers 206 in this example) to proactively redirect traffic in the event one or more components are likely to fail or otherwise result in a topology-changing event.

In one example, status information 210C, 210D and 210E respective convey current power consumption of amplifiers within optical components 208A, 208B and 208C, respectively. Controller 202 may poll monitoring agents within optical components 208 and request status information 210, or the monitoring agents may send the status information periodically or upon determining that an operating parameter is approaching a configured trigger within an operating range. In any event, the analytics engine within controller 202 applies rules that specify triggers for proactively changing the topology of network 200.

Figure 6:
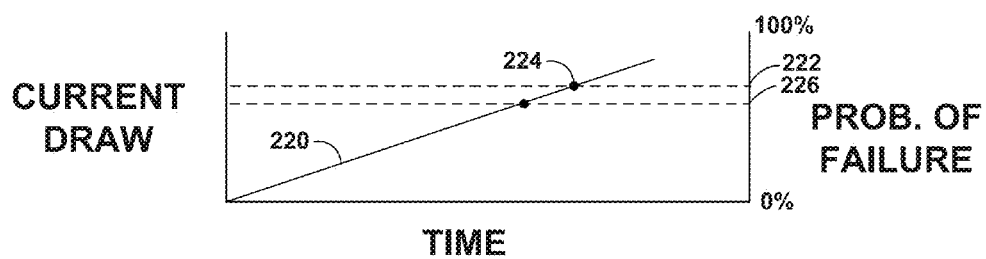
FIG. 6, for example is a graph that illustrates an example expected relationship between current draw over time by an optical amplifier and a probability of failure.

FIG. 6, for example is a graph that illustrates an example expected relationship between current draw over time by an optical amplifier and a probability of failure. As illustrated, it may be expected that current draw 220 for a given model of amplifier increases (e.g., linearly) over time so as to maintain a constant transmit power. Moreover, a trigger 224 may be defined as an indicator that the expected operating life of the amplifier is within a threshold probability 222 of failure. As such, the analytics engine of controller 202 may be configured with a rule that implements the example expected relationship illustrated in FIG. 6. That is, an administrator may create, for example, a rule that triggers a topology changing action in the event current draw from an underlying optical component 208 exceeds trigger 222. Responsive to detecting that such a condition exists, the path computation element of controller 202 may proactively reroute traffic around the link that has been predicted to fail.

The example described and illustrated works not only for optical amplifiers, but any laser-based amplification or just laser-based signaling component e.g. local oscillator, laser-signal, optical pre- and post-amplifiers, optical booster, semi-conductor optical amplifier (SOA) and similar optical components.

As another example, an agent may signal the status of the device solely based on its age. This may gain be beneficial as optical devices undergo commoditization and simplification for capital/expenditure (CapEx) reasons and, as such, lifetime specifications for optical components may be fairly limited.

Moreover, in some examples measurement of the functional parameters described above may be combined with the reported age of a device. Prediction for failure for devices that operating at maximum of specification may be defined within the rules to have a much lower device life-time than devices not consistently operated at its maximum specification. For example, based on the measurable environmental conditions such as temperature and humidity, the impact of mechanical vibrations with respect to life-time of the device can be predicted by the analytical engine.

In another example, any of the monitoring agents may locally apply rules, such as the example rule discussed above, to operating parameters of the local electronic components. In this example, any of status information 210A-210G may take the form of communications that convey results of the rules. For example, any of status information 210 may convey results of one or more locally applied rules, such as: (1) STATUS OK indicating that all parameters are below trigger points, (2) FAILURE PENDING indicating that a corresponding rule resulted in a threshold be triggered, and (3) FAILED indicating that a component has actually failed. The status information (2) FAILURE PENDING might, in some example, include a prediction of when the outage of the component may be expected to occur, an indicator that the determined probability of an outage is exceeding a pre-configurable threshold or even the determined probability itself.

In some examples, controller 202 may apply complex rules that are based on status information received from multiple underlying components. For example, rules may be defined based on an overall probability of failure for multiple devices or components associated with the same optical link or routing/switching location. As one example, controller 202 may apply a complex rule to status information 210C-210E as all of the respective optical components 208A-208C are associated with a common optical link between packet-optical transport devices 204A, 204B. Although none of optical components 208 may individually trigger the rule discussed above so as to cause a topology change, a second rule may be defined to trigger a topology change in the event that any two or more of the optical components are experience current draw above a second, lower threshold 226. Other complex rules may easily be defined that combine thresholds and different operating parameters, such as current draw and operating temperature, from any combination of optical components of the underlying packet-optical transport system. Moreover, any of the rules may trigger topology changing actions within controller 202, including path selection and control by controller 202 of the routing/switching components and/or wavelength and spectrum assignment within packet-optical transport devices. In this way, controller 202 provides centralized, closed-loop control and management of both systems, including routers 206A, 206B of the routing/switching system and packet-optical transport devices 204A, 204B of the underlying packet-optical transport system.

Figure 7:
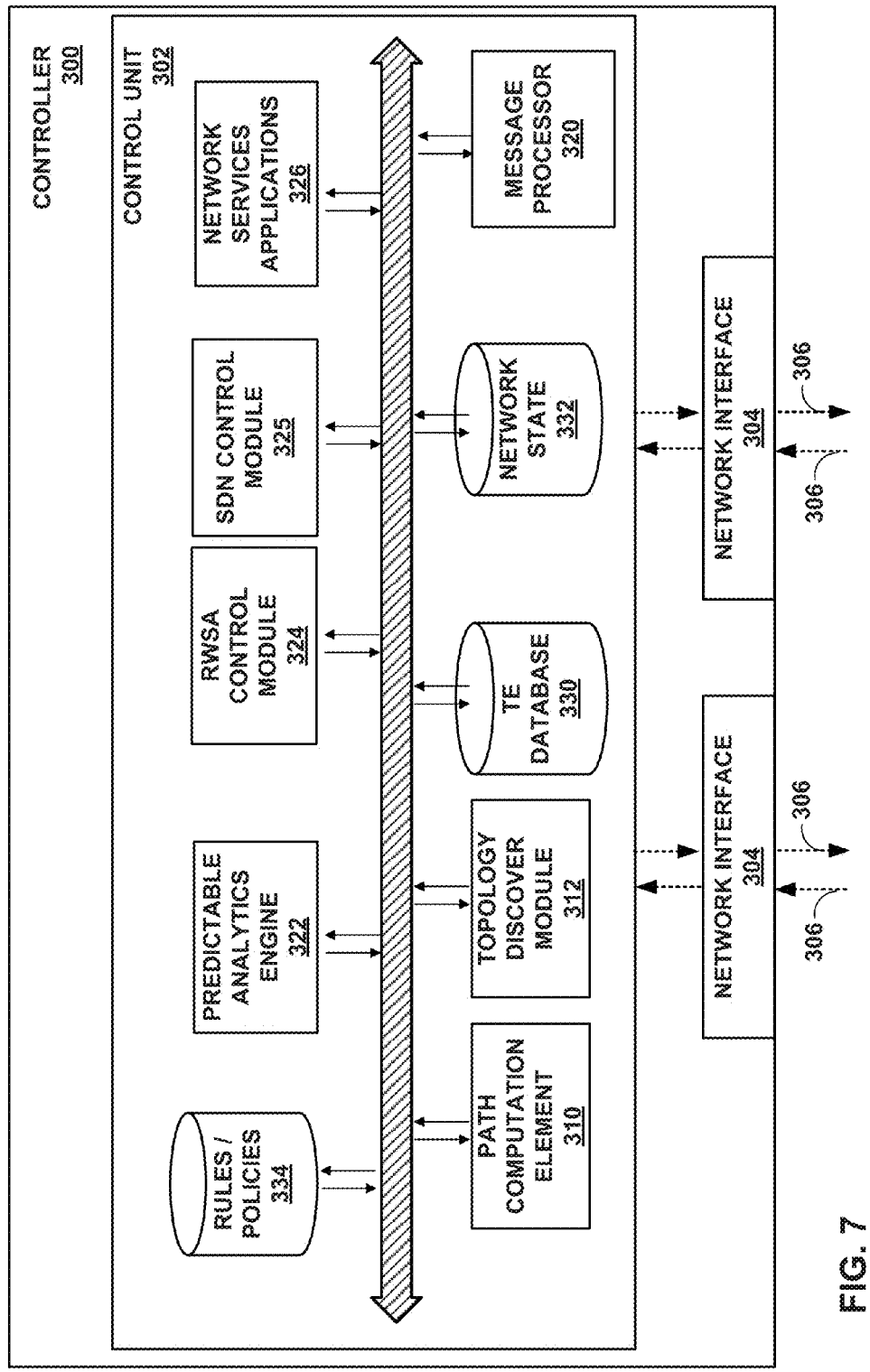
FIG. 7 is a block diagram illustrating an example centralized controller 300 that operates in accordance with the techniques of this disclosure.

FIG. 7 is a block diagram illustrating an example centralized controller 300 that operates in accordance with the techniques of this disclosure. Controller 300 may be implemented as a separate physical device or virtual device and for example, and may represent an example instance of controllers 22, 42, 202 described herein.

Controller 300 includes a control unit 302 coupled to one or more network interfaces 304 to exchange packets with other network devices by links 306. Control unit 302 include one or more processors (not shown in FIG. 7) that execute software instructions, such as those used to define a software or computer program, stored to a computer-readable storage medium, such as non-transitory computer-readable mediums including a storage device (e.g., a disk drive, or an optical drive) or a memory (such as Flash memory or random access memory (RAM)) or any other type of volatile or non-volatile memory, that stores instructions to cause the one or more processors to perform the techniques described herein. Alternatively or additionally, control unit 302 may comprise dedicated hardware, such as one or more integrated circuits, one or more Application Specific Integrated Circuits (ASICs), one or more Application Specific Special Processors (AS-SPs), one or more Field Programmable Gate Arrays (FPGAs), or any combination of one or more of the foregoing examples of dedicated hardware, for performing the techniques described herein.

As described herein, controller 300 includes both an RWSA (Routing Wavelength and Spectrum Assignment) control module 324 and an SDN control module 325 that cooperate to provide integrated closed-loop control over both routing/switching system and an underling optical transport system within a network. In the example of FIG. 1, control unit 302 provides an operating environment for path computation element 310, topology discover module 312, message processor 320, analytics engine 322, RWSA control module 324, SDN control module 325 and network services application 326. In one example, these modules may be implemented as one or more processes within control unit 302 or may execute on one or more virtual machines of one or more servers communicatively coupled to controller 300. That is, while generally illustrated and described as executing on a single controller 300, aspects of these modules may be delegated to other computing devices in a distributed manner.

Message processor 320 receives real-time status information from monitoring agents distributed and installed within packet-optical transport devices and optical components of underlying optical transport system. Message processor 320 processes the status information and updates network state database 332. Responsive to the status information, analytics engine 322 applies rule-based of policies 334 and outputs messages to RWSA control module 324 and SDN control module 325, thereby adaptively and proactively reroute communications within the network.

More specifically, response to applications of policies 334 by analytics engine 322, SDN control module 325 may invoke path computation element 310 to compute one or more new paths through a network. SDN control module 325 configures routers and/or switches within the network to adaptively and proactively reroutes communications within the network in accordance with the computed paths. SDN control module 325 may implement, for instance, a Path Computation Element Communication Protocol (PCEP) or a software-defined networking (SDN) protocol, such as the OpenFlow protocol, to provide and direct the nodes to install forwarding information to their respective data planes. Additional details regarding OpenFlow are found in "OpenFlow Switch Specification version 1.1.0", OpenFlow Consortium, February 2011, which is incorporated by reference herein. Additional details regarding PCEP may be found in "Path Computation Element (PCE) Communication Protocol (PCEP)," Network Working Group, Request for Comment 5440, March 2009, the entire contents of each of which being incorporated by reference herein. In addition, or alternatively, SDN control module 325 may configure forwarding tables within routers by other interface types, such as a Simple Network Management Protocol (SNMP) interface, path computation element protocol (PCEP) interface, a Device Management Interface (DMI), a CLI, Interface to the Routing System (IRS), or any other node configuration interface.

In addition to the higher-level control provided by SDN control module 324, RWSA control module 324 cooperatively and responsively updates routing wavelength and spectrum assignments (RWSA) based on any traffic flow changes engineered by path computation element 310. That is, based on any updated changes to current and/or predicted traffic flow due to SDN control module 324, RWSA control module 324 controls and rebalances wavelength and spectrum assignment of the underlying packet-optical transport system.

TE discovery module 312 represents one or more routing protocol process that maintains TE database 330. For example, TE discover module 312 may execute a routing protocol to receive routing protocol advertisements, such as Open Shortest Path First (OSPF) or Intermediate System-to-Intermediate System (IS-IS) link state advertisements (LSAs) or Border Gateway Protocol (BGP) UPDATE messages. In some instances, topology indication module 64 may alternatively, or additionally, execute a topology discovery mechanism such as an interface for an Application-Layer Traffic Optimization (ALTO) service.

Traffic engineering (TE) database 330 stores topology information, received by topology discovery module 312, for a network that constitutes a path computation domain for controller 300. TED 330 may include one or more link-state databases (LSDBs), where link and node data is received in routing protocol advertisements, received from a topology server, and/or discovered by link-layer entities such as an overlay controller and then provided to topology discover module 312. In some instances, an operator may configure traffic engineering or other topology information within TED 72 via a client interface.

Network services applications 326 represent one or more processes that provide services to clients of a service provider network. Network services applications 326 may provide, for instance, include Voice-over-IP (VoIP), Video-on-Demand (VOD), bulk transport, walled/open garden, IP Mobility Subsystem (IMS) and other mobility services, and Internet services to clients of the service provider network. Networks services applications 326 may require services provided by controller 300, such as node management, session management, and policy enforcement. Each of network services applications 326 may include client interface, such as a command line interface (CLI), graphical user interface (GUI) or application programming interface (API), by which one or more client applications request high-level network services.

The control architecture in FIG. 7 may be applied to address other very severe challenges in networks. For example, the architecture may help overcome challenges with the availability of devices and the health of the network connections, as described, but also help overcome some of the restrictions induced by the optical transport network itself. One of restrictions that may be overcome is rolling-over wavelengths, that might be blocking, by way of the controller architecture. The system may help overcome limitation due to the optical filter structure, DWDM bandwidth limitation in one path or physical limitation of the ROADM and PXC architecture. The underlying transport infrastructure may become, at least to some extent, virtualized for the end-to-end path.

For example, in general, fixed ROADM's are ROADM's with a pre-defined and fixed wavelength for a dedicated port.

In tunable ROADM's, on the other side for a given port, any wavelength can be set, provided it is not already allocated. The system proposed herein including controller 300 and the RWSA control module 324 and analytics engine 322, as depicted in FIG. 7, may deliver a seamless and tunable solution for the network services (L2/L3 service applied to packet flows). A network service (e.g. L2/L3VPN) between two points may be mapped into the fixed ROADM infrastructure and automatically, depending on the demands and service attributes, adjusted. As such, the systems described herein do not merely virtualize the transport layer of the network but rather enhance the capabilities due to a higher-level view of the controller. In this way, a stand-alone physical fixed ROADM a virtual tunable ROADM is created from the underlying, stand-alone physical fixed ROADM system using the integrated controller. The example also applies for a fixed PXC and a tunable PXC.

As another example, instead of a single optical transport (e.g, DWDM) system, there may be several DWDM systems deployed that are connected to one or more routing/switching systems, all of which are monitored and controlled in accordance with the techniques described herein. The controller is able to place network service demands optimally into the transport networks. This results, from a network service perspective, in a seamless end-to-end network. The system creates out of two physical DWDM systems, a single virtualized one underlying optical transport network that is centrally managed, e.g., with respect to routing wavelength and spectrum assignment, based on current or predicted demand for higher level (L7-L2) services. The controller may optimize load balancing between the DWDM networks, availability and reliability considerations by ideal packet flow placement and ideal wavelength placements into the underlying optical transport infrastructure.

As another example, a ROADM or PXC might be fully or partially eliminated and replaced by routers/switches that are directly connected with a DWDM transport system. ROADM's would not physically exist but the system as such could steer the network traffic in a way that is equivalent to a virtual tunable & directionless ROADM or PXC. Also a ROADM and point-to-point DWDM system might be deployed physically at the same location but some of the DWDM wavelength might be terminated directly at the router w/o the ROADM. Also for this example the system could steer the network traffic in a way that is equivalent to a virtual tunable & directionless ROADM or PXC.

As another example, an optical transport system may physically include a single OTT or ROADM filter structure but include multiple, different line systems with different amplification systems. This physically divided network, e.g., two different optical amplifier chains, may utilize the same DWDM system, i.e., because the filter systems are the same. This type of network may also be virtualized by the control architecture described herein into a single logical optical transport system to which closed-loop control can be applied. For such a system, the controller may optimize load balancing between the underlying optical transport DWDM networks and availability and reliability considerations by selecting and configuring ideal packet flow placement within the routing/switching system and ideal wavelength placements within the underlying optical transport system.

As another example, in Ingress Policy-determined multi-layer routing, packet flows are combined at the edge and LSP's are formed. A path is setup throughout the network for each LSP and used to transport packets mapped to that LSP. This architecture has several challenges. First, as the underlying transport network capacities and redundancy is typically not known, path setup may not be optimal. Second, as the bandwidth of the ingress flows can change widely, the initially setup path many no longer be optimal due to blocking effects. Third, as the ingress flows attributes change, the routing of the network may need to change, e.g. the need for specific resiliency, latency might be changing as well. The integrated described herein (e.g., controller 300 in FIG. 7) is able to determine the packaging of the flows into LSP to fit the ingress demands to the routing perfectly, inclusive of all the network resources. In summary for every specific network service class, with its own policy, attributes, the virtualized environment controlled by the controller can be optimized. This results into a virtual "slicing" of the network.

As another example, a best effort High Speed Internet (HSI) traffic flow might be connected with best effort not-protected underlying transport equipment. Network policy and shaping that is known to the controller can then place the network service by assigning only one wavelength with no redundancy.

As another example, a network service with high resiliency, guaranteed bandwidth requirements may need to be placed. The controller described herein may automatically build multiple redundancies on the transport layers (e.g. creating several redundant wavelengths) and on the router & switched layer (e.g. port redundancy), and is able to analyze the availability prediction and match it with the network service requirements.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various embodiments of the invention have been described. These and other embodiments are within the scope of the following claims.

The invention claimed is:

1. A system comprising:
   a routing and switching network having a plurality of interconnected layer three (L3) routing components and layer two (L2) switching components for communicating packet-based network traffic;
   a plurality of packet-optical transport devices interconnected to form an optical transport system and coupled to the routing and switching system for optically transporting the network traffic between the routing and switching components; and
   a controller comprising:
      a path computation element to compute paths for the network traffic through the routing and switching network;
      a software defined networking control module to communicate updated routing information to the routing components of the routing and switching network to control packet flows through the routing and switching network in accordance with the computed paths; and
      a routing wavelength and spectrum assignment control module to that configures the packet-optical transport devices to operate at particular wavelengths in response to the updated routing information and bandwidth requirements for the network traffic.

2. The system of claim 1, wherein the controller further comprises:
   a message processor that receives state information from the routing and switching network;
   wherein, responsive to the state information for the routing and switching network, the path computation elements computes one or more new paths for the network traffic through the routing and switching network; and
   wherein the wavelength and spectrum assignment module executes a closed-loop control process configure the packet-optical transport devices to operate at particular wavelengths in response to the updated routing information and bandwidth requirements for the network traffic.

3. The system of claim 2, wherein the state information indicates a current bandwidth consumption or a current congestion at each of the routing components.

4. The system of claim 1, wherein the controller further comprises:
   a routing protocol that receives routing information from the routing devices of the routing and switching system; and
   a traffic engineering database that stores the routing information,
   wherein the path computation element computes the paths in accordance with the traffic engineering data and updates topology information within the traffic engineering database in accordance with the computed paths, and
   wherein the routing wavelength and spectrum assignment control modules determines the wavelength assignments for the packet-optical transport devices in accordance with the updated topology information.

5. The system of claim 1, wherein the wavelength and spectrum assignment module of the controller executes a closed-loop control process configure the packet-optical transport devices to operate at particular wavelengths in response to paths through the routing and switching network computed by the path computation element.

6. The system of claim 1, wherein the wavelength and spectrum assignment module of the controller is configured to:
   determine, for each of the packet-optical transport devices, a respective channel group size specifying a number of optical channels to reserve for each of the packet-optical transport devices from a total number of optical channels supported by the optical transport system, wherein the respective channel group size for each of the packet-optical transport devices is determined based on a bandwidth requirement for the respective packet-optical transport device;
   reserve, in accordance with the determined channel group sizes, a set of optical channels for each of the packet-optical transport devices from an optical spectrum supported by the packet-optical transport devices, each of the reserved optical channels having an unspecified wavelength within the optical spectrum, each of the sets of optical channels associated with a different portion of the optical spectrum and having an spectral range that is based on the channel group size determined for the respective packet-optical transport device; and
   for each of the packet-optical transport devices, assign a respective wavelength from the optical spectrum to one or more of the optical channels of the set of optical channels reserved for the packet-optical transport device to balance network traffic level associated with the packet-optical transport device around a center of the portion of the optical spectrum associated with the set of optical channels reserved for the packet-optical transport device.

7. The system of claim 6, wherein the wavelength and spectrum assignment module is configured to:
   determine, for each of the packet-optical transport devices, a center of the portion of the optical spectrum reserved for the respective packet-optical transport device;
   determine, for each of the packet-optical transport devices, the number of optical channels in the set of optical channels reserved to which to assign a respective wavelength so as to provide bandwidth that satisfies the bandwidth requirement associated with the respective packet-optical transport device; and
   assign, for each of the packet-optical transport devices, a respective wavelength to the determined number of optical channels in a distribution that balances the traffic flows around the center of the respective portion of the optical spectrum reserved for the packet-optical transport device.

8. The system of claim 6, wherein bandwidth requirement for each of the packet-optical transport devices is based on current bandwidth utilization for the respective packet-optical transport device.

9. The system of claim 6, wherein bandwidth requirement for each of the packet-optical transport devices is based on a predicted bandwidth utilization for the respective packet-optical transport device.

10. The system of claim 6, wherein the wavelength and spectrum assignment module is configured to output messages to configure each of the packet-optical transport devices to forward packet data in accordance with the assigned wavelengths.

11. A method comprising:
receiving, with an integrated network controller, state information from a routing and switching network having a plurality of interconnected layer three (L3) routing components and layer two (L2) switching components for communicating packet-based network traffic;
computing, with a path computation element of the controller, a plurality of paths for layer three (L3) packets through the routing components;
communicating, with a software defined network (SDN) control module of the controller, updated routing information to the routing components to control packet flows through the routing and switching network in accordance with the computed paths; and
configuring, with a routing wavelength and spectrum assignment control module of the controller, the packet-optical transport devices to operate at particular wavelengths in response to the computed paths and bandwidth requirements for the network traffic at the routers along the paths.

12. The method of claim 11, further comprising:
receiving, with the controller, state information from the routing components and the switching components of the routing and switching network and from the packet-optical transport devices of the optical transport network;
responsive to the state information, computing one or more new paths for the network traffic through the routing and switching network; and
executing a closed-loop control process with the wavelength and spectrum assignment module to configure the packet-optical transport devices to operate at particular wavelengths in response to the new paths and bandwidth requirements for the routing components along the new paths.

13. The method of claim 12, wherein the state information indicates a current bandwidth consumption or a current congestion at each of the routing components.

14. The method of claim 12, wherein the state information includes one or more of power consumption, current draw, voltage levels or operating temperature for the routing components and the switching components.

15. The method of claim 12, wherein the state information includes one or more of power consumption, current draw, voltage levels or operating temperature for the optical components of the optical transport network.

16. The method of claim 12, wherein the packet-optical transport devices comprises any of Re-configurable Optical Add Drop Multiplexers (ROADMs), Photonic Cross Connects (PXCs), optical cross-connects (OXCs), Dense Wavelength Division Multiplexing equipment (DWDMs), amplifiers, transponders, and Optical Termination Terminals (OTTs).

17. The method of claim 12, wherein configuring, with a routing wavelength and spectrum assignment control module of the controller, the packet-optical transport devices to operate at particular wavelengths comprises:
determining, for each of a plurality of packet-optical transport devices interconnected to form an optical transport system, a respective channel group size specifying a number of optical channels to reserve for each of the packet-optical transport devices from a total number of optical channels supported by the optical transport system, wherein the respective channel group size for each of the packet-optical transport devices is determined based on a bandwidth requirement for the respective packet-optical transport device;
reserving, in accordance with the determined channel group sizes, a set of optical channels for each of the packet-optical transport devices from an optical spectrum supported by the packet-optical transport devices, each of the reserved optical channels having an unspecified wavelength within the optical spectrum, each of the sets of optical channels associated with a different portion of the optical spectrum and having an spectral range that is based on the channel group size determined for the respective packet-optical transport device; and
for each of the packet-optical transport devices, assigning a respective wavelength from the optical spectrum to one or more of the optical channels of the set of optical channels reserved for the packet-optical transport device to balance network traffic level associated with the packet-optical transport device around a center of the portion of the optical spectrum associated with the set of optical channels reserved for the packet-optical transport device.

18. The method of claim 17, wherein assigning a respective wavelength from the optical spectrum to one or more of the optical channels of the set of optical channels reserved for the packet-optical transport device comprises, for each of the packet-optical transport devices:
determining a center of the portion of the optical spectrum reserved for the respective packet-optical transport device;
determining the number of optical channels in the respective optical channels reserved for the packet-optical transport device to which to assign a respective wavelength to provide bandwidth that exceeds the bandwidth requirement associated with the respective packet-optical transport device; and
assigning, for each of the packet-optical transport devices, respective wavelength to the number of optical channels to balance the traffic flows around the center of the respective portion of the optical spectrum reserved for the packet-optical transport device.

19. The method of claim 17, wherein bandwidth requirement for each of the packet-optical transport devices is based on current bandwidth utilization for the respective packet-optical transport device.

20. The method of claim 17, wherein bandwidth requirement for each of the packet-optical transport devices is based on a predicted bandwidth utilization for the respective packet-optical transport device.

21. An integrated network controller comprising:
a path computation element that computes paths for the network traffic through a routing and switching network having a plurality of interconnected layer three (L3) routing components and layer two (L2) switching components for communicating packet-based network traffic;
a software defined networking (SDN) control module that communicates updated routing information to the routing components of the routing and switching network to control packet flows through the routing and switching network in accordance with the computed paths; and
a routing wavelength and spectrum assignment control module that configures each of a plurality of packet-optical transport devices an optical transport system to operate at particular wavelengths in response to the updated routing information and bandwidth requirements for the network traffic for optically transporting the network traffic between the routing and switching components.

22. The integrated network controller of claim 21, wherein the controller further comprises:
   a message processor that receives state information from the routing and switching network;
   wherein, responsive to the state information for the routing and switching network, the path computation elements computes one or more new paths for the network traffic through the routing and switching network; and
   wherein the wavelength and spectrum assignment module executes a closed-loop control process configure the packet-optical transport devices to operate at particular wavelengths in response to the updated routing information and bandwidth requirements for the network traffic.

\* \* \* \* \*